Sept. 5, 1961

J. C. BUDDE 2,998,919

THREE SOLENOID MIXING VALVE

Filed Sept. 12, 1957

INVENTOR.
JAMES CLARENCE BUDDE
BY
Smith, Olsen, Lewis & McRae

Sept. 5, 1961 J. C. BUDDE 2,998,919
THREE SOLENOID MIXING VALVE
Filed Sept. 12, 1957 3 Sheets-Sheet 2

INVENTOR.
JAMES CLARENCE BUDDE
BY
SMITH, OLSEN, LEWIS & McRAE

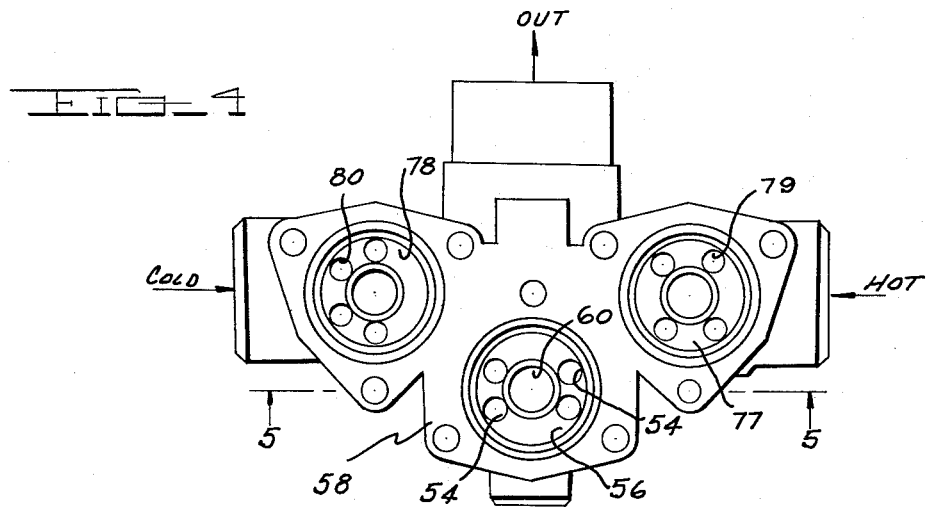
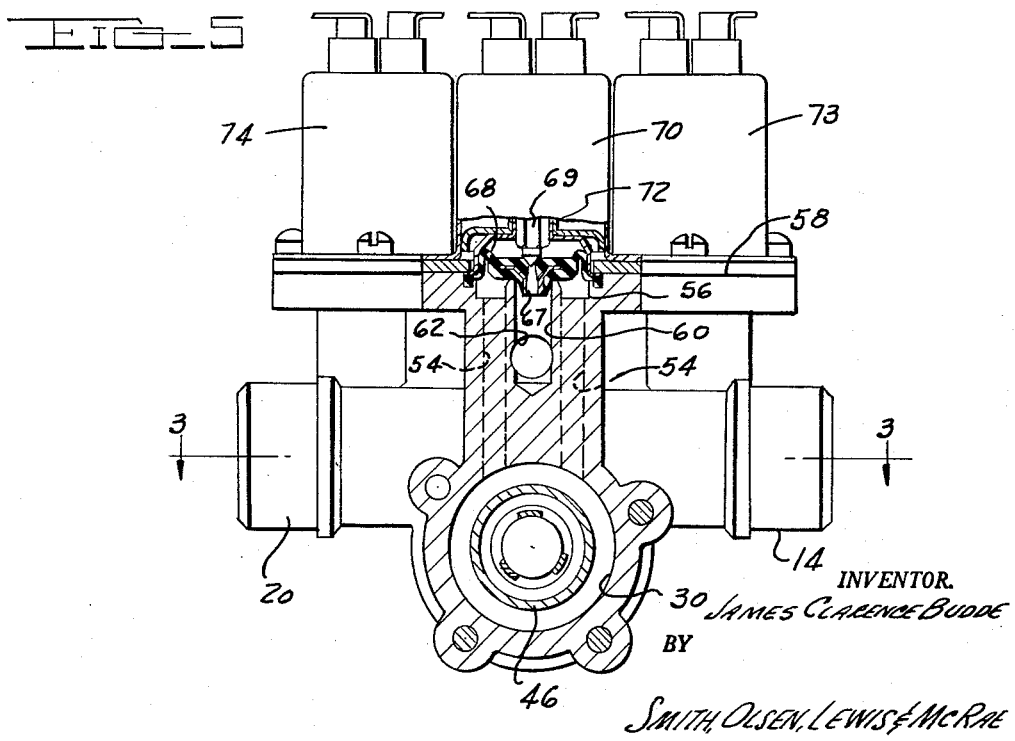

United States Patent Office 2,998,919
Patented Sept. 5, 1961

2,998,919
THREE SOLENOID MIXING VALVE
James Clarence Budde, Detroit, Mich., assignor to American Radiator & Standard Sanitary Corporation, New York, N.Y., a corporation of Delaware
Filed Sept. 12, 1957, Ser. No. 683,485
3 Claims. (Cl. 236—12)

This invention relates to a solenoid-operated valve for mixing hot and cold fluids in a manner to provide five or more different temperature outlet fluids. The valve is particularly useful for delivering water of various different temperatures to the spigot of a kitchen sink; when so used, the valve solenoids are controlled by push button switches located at easily accessible positions adjacent the sink, the arrangement being such that manual depression of each individual push button is effective to cause the valve to deliver water of a different temperature through the spigot. The valve is capable of delivering extremely hot fluid (i.e. fluid having the same temperature as the hot inlet fluid), or extremely cold fluid (i.e. fluid having the same temperature as the cold inlet fluid), as well as three or more intermediate temperature fluids.

Objects of the invention are to provide a three solenoid mixing valve wherein:

(1) The valve will be ensured of delivering only cold fluid when the cold solenoid is alone energized, i.e. there is no danger that hot fluid will flow through the mixing chamber into the cold fluid line so as to undesirably raise the outlet fluid temperature. In this manner the user is ensured of obtaining extremely cold fluid, as for example for drinking purposes.

(2) The valve housing is constructable from a single brass forged body, thereby reducing construction costs, and providing a valve body which is comparatively strong, requires little or no testing, and has a comparatively long service life.

(3) The valve body is constructed as a metal member, which passes local plumbing codes, it being appreciated that the plumbing codes generally do not accept valve bodies formed of plastic materials.

(4) The valve is of relatively small size (considering the number of solenoids which it carries and the functions which it performs), whereby to adapt it for use in small spaces.

(5) The three valve solenoids are each positioned on a single face of the valve housing, whereby to present their terminals to a single area alongside of the value in such manner as to enable the various electrical lines to be easily and conveniently connected to the solenoids without requiring the installation man to reach into concealed spaces beneath or behind the valve housing.

Other objects of this invention will appear in the following description and appended claims, reference being had to the accompanying drawings forming a part of this specification wherein like reference characters designate corresponding parts in the several views.

In the drawings:

FIG. 4 is a top plan view of the FIG. 1 embodiment with parts broken away on line 4—4 in FIG. 1 to illustrate certain passages formed in the valve housing body.

FIG. 5 is a sectional view on line 5—5 in FIG. 2.

Figure 1:
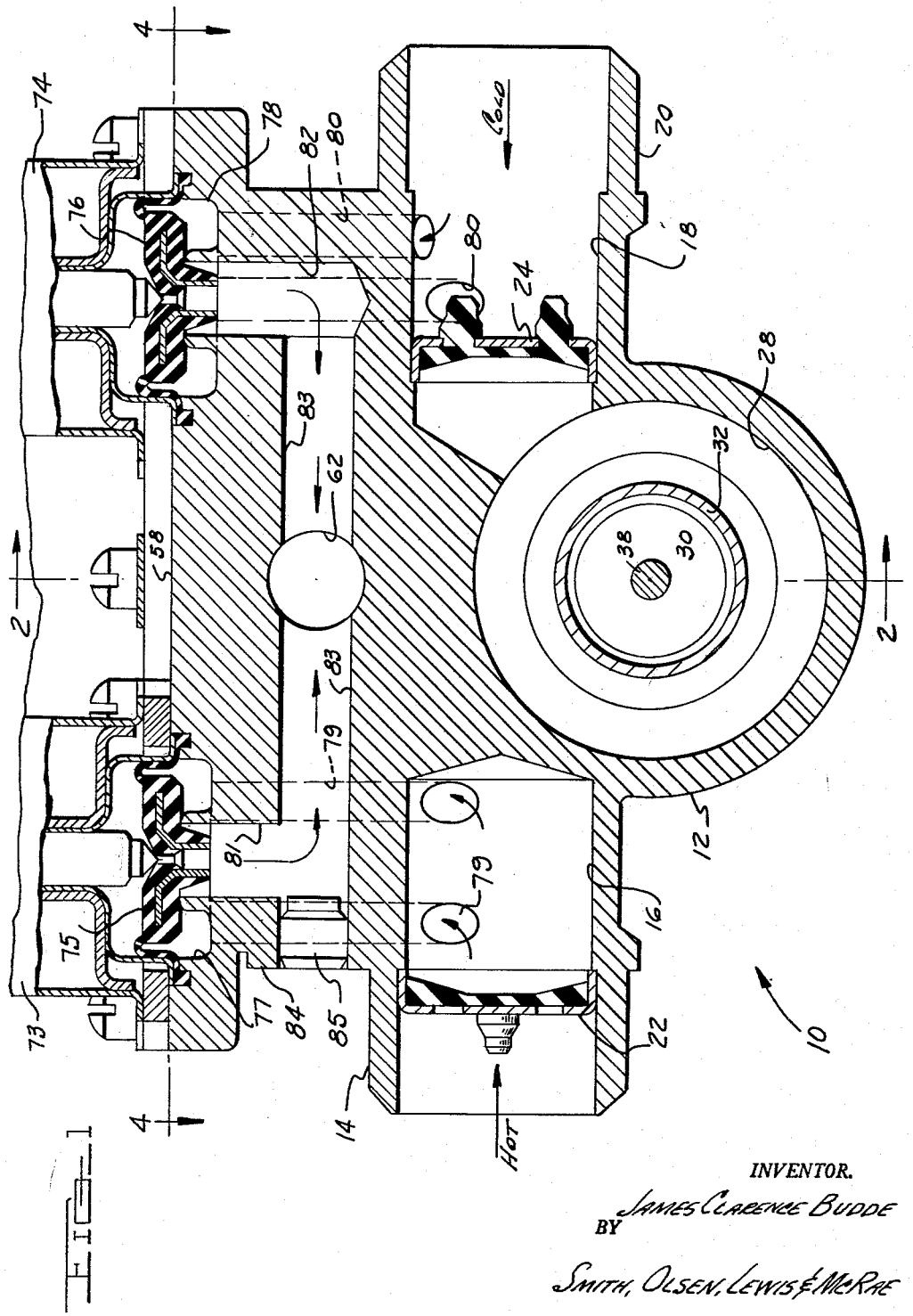
FIG. 1 is a sectional view of one embodiment of the invention, taken on line 1—1 in FIG. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phaseology or terminology employed herein is for the purpose of description and not of limitation.

In the drawings there is shown a mixing valve 10 comprising a one piece valve body 12, preferably formed as a brass forging. Body 12 is initially formed without any interior passages or chambers, the various passages and chambers being machined out of the body after its formation.

Body 12 is provided with an integrally formed hot fluid inlet coupling 14 which is drilled out to form a hot fluid inlet passage 16. Introduction of cold fluid is through a drilled out passage 18 formed in a cold fluid coupling 20. Check valves 22 and 24 prevent reverse flow in the inlet passages.

Figure 2:
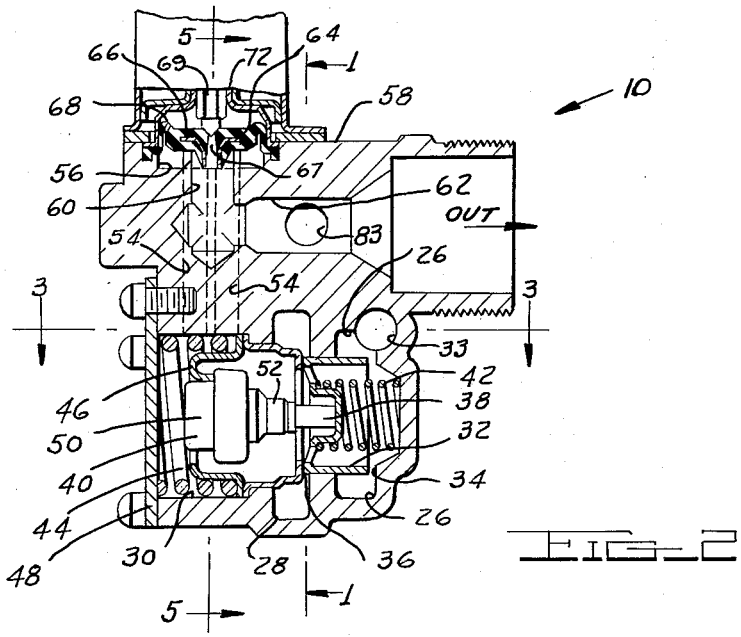
FIG. 2 is a sectional view taken on line 2—2 in FIG. 1.
Figure 3:
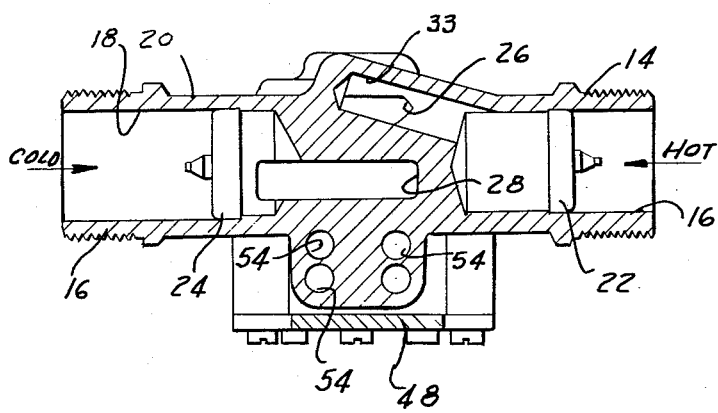
FIG. 3 is a sectional view taken on lines 3—3 in FIGS. 2 and 5.

The valve body is internally machined to provide a first annular recess 26 (FIGS. 2 and 3), a second annular recess 28, and a cylindrical mixing chamber 30. A straight passage 33 is drilled angularly from the end of passage 16 so as to intersect recess 26 and thereby put said recess in fluid communication with inlet coupling 14. Passage 18 communicates directly with recess 28 (FIG. 3).

Fluid flow from recesses 26 and 28 into chamber 30 is controlled by a tubular slide valve element 32 which has limited movement between annular valve surfaces 34 and 36. Element 32 is engaged by the piston 38 of a thermostatic power element 40. A "return" spring 42 holds the valve element against piston 38 and an "override" spring 44 is engaged between a bracket 46 and a cover plate 48 to operatively position the power element. The power element may take any of several forms, as for example the form shown in U.S. Patent No. 2,636,776 issued to Sergius Vernet.

In operation of the power element, a thermally expansible wax pellet within power element cup 50 moves piston 38 outwardly of guide sleeve 52 when the fluid temperature in chamber 30 is increased. Such a piston movement forces valve element 32 toward seat 34 so as to restrict the flow of hot fluid into the mixing chamber and thereby reducing the temperature of the mixed fluid. This action causes the wax pellet to contract so as to allow spring 42 to force valve element 32 toward valve surface 36 and restrict the flow of cold fluid. The total effect is to produce a relatively constant temperature mixed fluid.

The mixed fluid is discharged from mixing chamber 30 through four straight passages 54 (FIGS. 2, 3 and 5) which are drilled from an annular groove 56 formed in external face 58 of the valve body.

Another straight passage 60 (FIGS. 2, 4, and 5) is drilled concentrically of groove 56 into an additional straight passage 62, which forms an outlet passage for the discharge of fluid from the valve.

Groove 56 cooperates with passage 60 to define an annular valve surface 64 located beneath rubber diaphragm 66. The diaphragm is provided with a central opening 67 and bleed opening 68. Opening 67 registers with an armature-plunger 69 of a solenoid 70.

In operation, when solenoid 70 is energized plunger 69 is withdrawn from opening 67 to allow the fluid pressure in groove 56 to move the diaphragm upwardly and permit fluid flow into passage 60. When solenoid 70 is de-energized a compression spring (not shown) in the outer end of guide sleeve 72 forces plunger 69 downwardly to close opening 67; the fluid in groove 56 flows through bleed opening 68 so as to develop a downward force on the upper face of the diaphragm and thereby seat the diaphragm in a closed position against valve surface 64.

It will be noted from FIGS. 1 and 5 that the valve body is provided with two additional solenoids 73 and 74 positioned above diaphragms 75 and 76, respectively. These diaphragms overlie annular grooves 77 and 78 formed in valve body face 58. Four straight passages 79 are drilled from groove 78 into hot fluid inlet passage 16. Similarly, four straight passages 80 are drilled from groove 78 into cold fluid inlet passage 18. Additional "concentric" passages 81 and 82 are drilled from face 58 into a laterally extending passage 83, drilled from valve body face 84. A plug 85 closes the end of passage 83.

It will be noted from FIGS. 1 and 5 that passage 83 intersects outlet passage 62 so as to provide a discharge duct for the fluid in passages 81 and 82.

Diaphragms 75 and 76 control the flow of hot and cold fluids into respective ones of passages 81 and 82 in the same manner as previously discussed diaphgarm 66; consequently no further description is made of diaphragms 75 and 76 except to note that similar reference numerals have been employed for similar features of the three diaphragms.

It will be understood that the three solenoids can be energized singly or together to provide various different outlet temperatures.

When solenoid 73 alone is energized the only fluid flow is from hot fluid inlet passage 16 through the duct system provided by passages 79, 81, 83 and 62; consequently the outlet temperature is at a maximum.

When solenoid 74 alone is energized the only fluid flow is from cold fluid inlet passage 18 through the duct system provided by passages 80, 82, 83 and 62; consequently the outlet temperature is as cold as possible. In this connection it will be noted that check valve 24 is located between mixing chamber 30 and passages 80; as a result there is no possibility that hot fluid in recess 26 can flow through valve 32 into recess 28 and then mingle with the cold fluid being supplied through inlet passage 18. This feature ensures the user of obtaining truly cold water for drinking purposes.

When solenoid 70 is alone energized the only fluid flow is through the mixing chamber 30 into the duct system provided by passages 54, 60 and 62. Thus the outlet temperature corresponds with the mixed fluid temperature as regulated by power element 40.

When only the two solenoids 70 and 73 are energized the fluid from chamber 30 is mingled with the hot fluid flowing through passage 81, this mingling action taking place after the hot fluid has passed from passage 83 into passage 62. The outlet temperature is thus at a value between the hot fluid temperature and the mixed fluid temperature.

When only the two solenoids 73 and 74 are energized there is a direct mingling of the hot and cold fluids in passage portion 83; there is no flow through mixing chamber 30. The outlet temperature is at a value between the hot and cold fluid temperatures. For example, if the inlet temperatures are 120° F. and 60° F., respectively the outlet temperature may be 90° F. This outlet temperature will preferably be less than that obtained when only mixed solenoid 70 is energized, it being appreciated that the characteristics of power element 40 can be so chosen as to permit the major flow past valve element 32 to be hot fluid so as to give a relatively high mixed fluid temperature, as for example 95° F.

Other combinations of the three solenoids than that described above can be employed, but for many applications the above-enumerated combinations are sufficient to give a useful range of outlet temperatures.

As previously stated, the illustrated valve can be employed with "push button" controls and used to deliver varying temperature water streams to the spigot of a kitchen sink.

Installation space adjacent the conventional sink is somewhat limited, but the illustrated valve is fairly compact, considering the number of solenoids which it employs. In this connection it will be noted that all of the solenoids are positioned on the single face 58 of the valve body instead of being mounted on opposite or angularly adjacent faces; as a result the three solenoids take no more "vertical" space (FIG. 5) than would one or two solenoids.

By positioning all of the solenoids on a single face 58 the various terminals 90 (FIG. 5) are all accessible from a point above the valve housing, thereby enabling the installation man to connect the lead wires (not shown) without reaching behind or beneath the housing body.

I claim:

1. A mixing valve comprising a housing body formed with first, second and third annular grooves on one of its external faces; hot and cold fluid inlet couplings for the housing body; a straight passage extending into the housing body from the first groove to the hot fluid coupling; a second straight passage extending into the housing body from the second groove to the cold fluid coupling; a third straight passage in said body extending parallel to said one external face; a fourth straight passage concentric with the first groove and extending from said one external face into fluid communication with the third passage; a fifth straight passage concentric with the second groove and extending from said one external face to the third passage; a cylindrical mixing chamber formed in said housing body; a first annular recess surrounding said chamber and communicating with the hot fluid inlet coupling; a second annular recess surrounding said chamber and communicating with the cold fluid inlet coupling; a tubular slide valve within the mixing chamber having its opposite ends overlapping the recesses, whereby to control the relative amounts of hot and cold fluid introduced into the mixing chamber in accordance with its position of axial adjustment; thermostatic power means in said mixing chamber for axially adjusting the slide valve; a sixth straight passage extending from the third annular groove to a point in the mixing chamber downstream from the slide valve; a seventh straight passage concentric with the third groove and extending from said one external face to the third passage; an outlet passage leading from said third passage; and a solenoid-diaphragm means overlying each of the three annular grooves whereby to control fluid flow into the fourth, fifth and seventh passages.

2. The combination of claim 1 and further comprising check valve means in the cold fluid coupling downstream from the point of connection with the second passage, whereby to prevent flow of hot fluid from the mixing chamber into the second passage when only the diaphragm for the second groove is open.

3. A mixing valve comprising a housing body formed from a block of metal; straight hot and cold fluid inlet passages formed entirely in the block and extending inwardly from opposite sides of said body in substantial axial alignment with one another; a cylindrical mixing chamber formed in the block and opening into one face of said housing body perpendicular to the straight hot and cold fluid inlet passages; a cover plate closing said chamber; first and second axially spaced annular recesses formed in the cylindrical surface of the mixing chamber; a straight passage formed in the housing block and extending from the hot fluid inlet passage to the first annular recess; said cold fluid inlet chamber directly intersecting the second annular recess; a tubular slide valve within the mixing chamber having its opposite ends overlapping the recesses; thermostatic power means for moving the tubular slide valve axially to control the relative amounts of hot and cold fluid introduced into the mixing chamber; an outlet passage formed in said housing body; a first duct system formed in said body leading from the hot fluid inlet passage directly to the outlet passage; first solenoid-diaphragm means positioned on the housing body and controlling fluid flow through said first duct system; a second duct system formed in said body leading from the cold fluid inlet passage directly to the outlet passage; second solenoid-diaphragm means positioned on the housing body and controlling fluid flow through said second duct system; a third duct system formed in said body leading from the mixing chamber to the outlet passage; and third solenoid-diaphragm means positioned on the housing body and controlling fluid flow through said third duct system.

References Cited in the file of this patent
UNITED STATES PATENTS

| | | |
|---|---|---|
| 2,453,409 | Chase | Nov. 9, 1948 |
| 2,560,293 | Kempton | July 10, 1951 |
| 2,620,133 | Obermaier | Dec. 2, 1952 |
| 2,791,379 | Dew | May 7, 1957 |
| 2,827,238 | Barker | Mar. 18, 1958 |
| 2,898,045 | Beller | Aug. 4, 1959 |